United States Patent [19]

Siegenthaler

[11] Patent Number: 5,320,510
[45] Date of Patent: Jun. 14, 1994

[54] ROAD VEHICLE TIRE CURING STATION

[75] Inventor: Karl J. Siegenthaler, Rome-Ostia, Italy

[73] Assignee: Bridgestone Corporation, Tokyo, Japan

[21] Appl. No.: 967,001

[22] Filed: Oct. 27, 1992

[30] Foreign Application Priority Data

Oct. 31, 1991 [IT] Italy ............................ T091A 000826

[51] Int. Cl.⁵ .............................................. B29C 35/02
[52] U.S. Cl. ..................................... 425/28.1; 425/40; 425/44
[58] Field of Search ........................ 425/28.1, 40–42, 425/44, 47, 50

[56] References Cited

U.S. PATENT DOCUMENTS

| | | | |
|---|---|---|---|
| 2,495,102 | 1/1950 | Huff | 425/40 |
| 2,858,566 | 11/1958 | Brundage | 425/42 |
| 3,868,203 | 2/1975 | Turk | 425/40 |
| 3,969,050 | 7/1976 | Anderson | 425/40 |
| 4,698,002 | 10/1987 | Grotkasten | 425/40 |
| 5,120,209 | 6/1992 | MacMillan | 425/40 |
| 5,186,951 | 2/1993 | Siegenthaler | 425/28.1 |

Primary Examiner—James Mackey
Attorney, Agent, or Firm—David A. Thomas

[57] ABSTRACT

A curing station wherein a fixed frame and a slide traveling on the fixed frame, support respective portions of a curing device for an annular forming mold of a green tire. The mold is gripped axially between the two portions of the curing device and is in contact with axial heating plates on the aforementioned portions. The curing station presents a heating jacket defined by two semicylindrical heating plates which are movable to and from a closed position contacting the lateral surface of the mold.

7 Claims, 2 Drawing Sheets

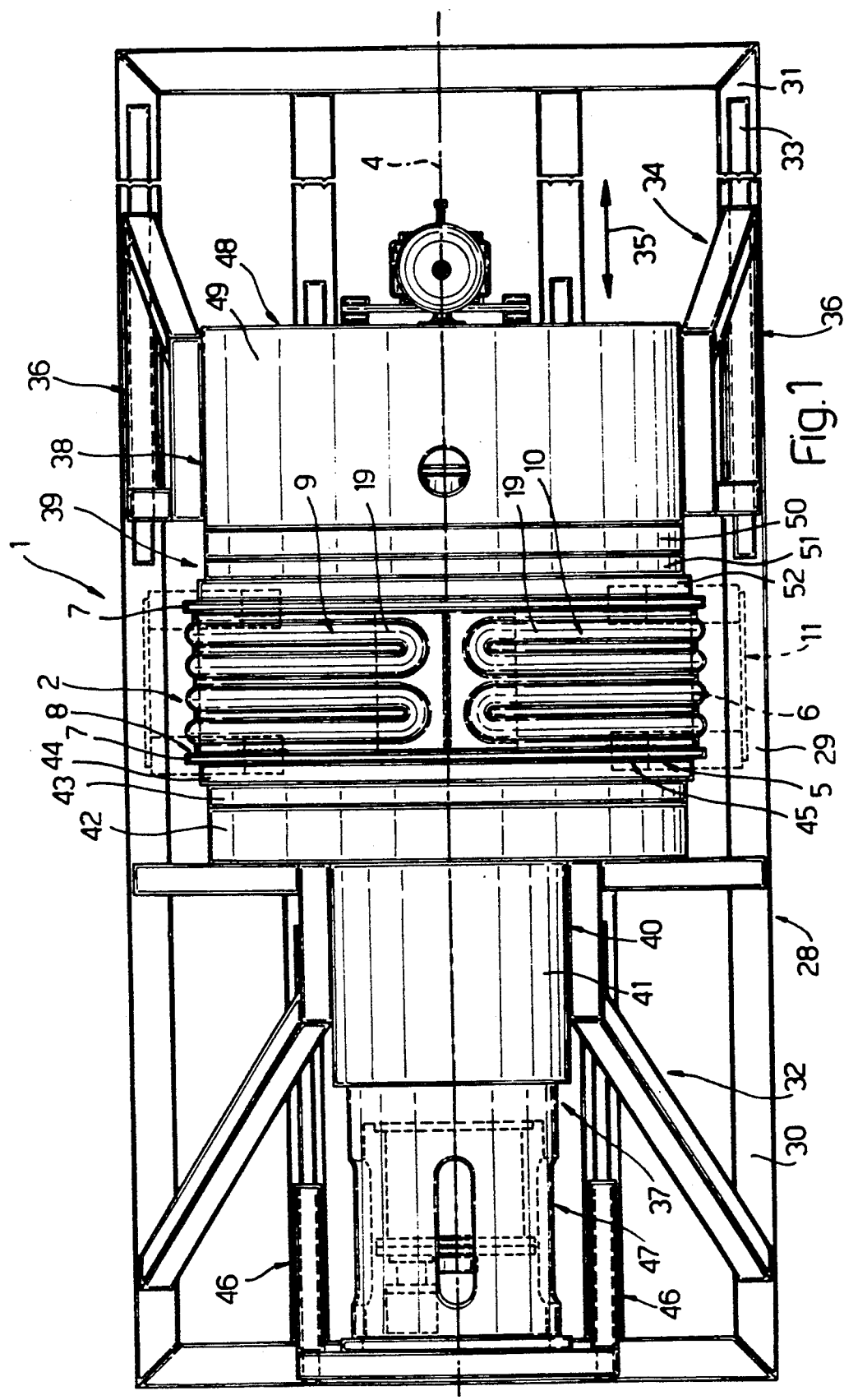

ROAD VEHICLE TIRE CURING STATION

BACKGROUND OF THE INVENTION

1. Technical Field

The present invention relates to a road vehicle tire curing station.

2. Background Information

Co-pending U.S. patent application filed concurrently herewith, corresponding to co-pending U.S. patent application Ser. No. 07/966,977, filed Oct. 27, 1992, to which full reference is made herein in the interest of full disclosure, relates to a road vehicle tire manufacturing process whereby a green tire is assembled inside an annular forming mold consisting of an outer annular body; two inner annular supports, each fitted to a respective bead portion of the tire; and two lateral annular plates connecting the two inner annular supports and the outer annular body.

According to the above process, the tire so formed is kept inside the forming mold until after curing.

SUMMARY OF THE INVENTION

It is an object of the present invention to provide a curing station designed to enable implementation of the above process in as straightforward a manner as possible, i.e. to enable the tire to be cured inside the aforementioned forming mold.

According to the present invention, there is provided a road vehicle tire curing station, characterized by the fact that it comprises a heating jacket defining a cylindrical seat for an annular forming mold of a green tire; a curing device comprising a first and second portion on opposite sides of said heating jacket and coaxial with the axis of said seat, one of said portions comprising a gas curing unit; and each of said portions comprising a front heating element coaxial with said axis; first actuating means for moving said two portions to and from said heating jacket, so as to bring said heating elements into contact with said mold inside said seat; and second actuating means for axially moving said curing unit to and from a position wherein it engages said mold inside said seat.

BRIEF DESCRIPTION OF THE DRAWINGS

A non-limiting embodiment of the present invention will be described by way of example with reference to the accompanying drawings, in which:

FIG. 1 shows a plan view of a preferred embodiment of the curing station according to the present invention;

BEST MODE FOR CARRYING OUT THE INVENTION

Figure 3:
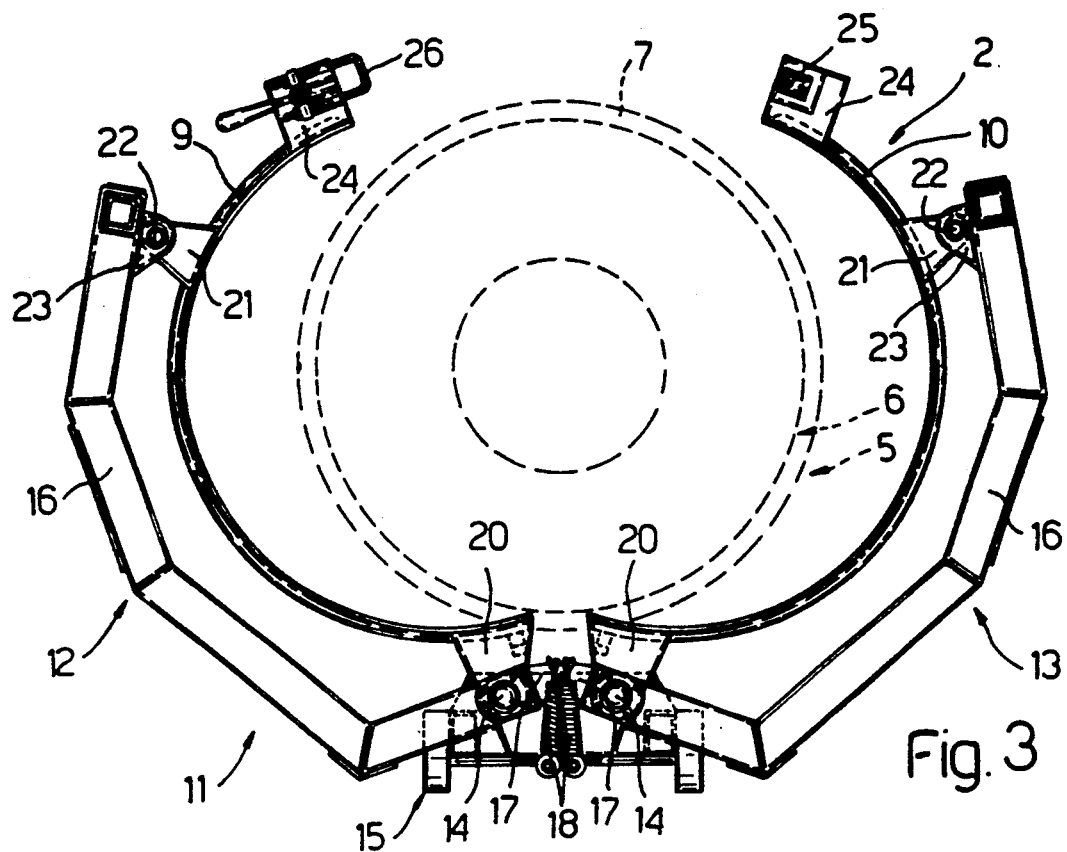
FIGS. 2 and 3 show a side view of a detail in FIG. 1 in two different operating positions.

Number 1 in FIG. 1 indicates a road vehicle tire curing station, a central portion of which consists of a heating jacket 2 defining a cylindrical seat 3 (FIG. 2) having an axis 4 and designed to receive an annular mold 5 for forming a green tire (not shown). Mold 5 presents a cylindrical lateral outer surface 6 defined axially by two end ribs 7 defining, together with surface 6, a circumferential groove 8 for housing jacket 2.

Figure 2:
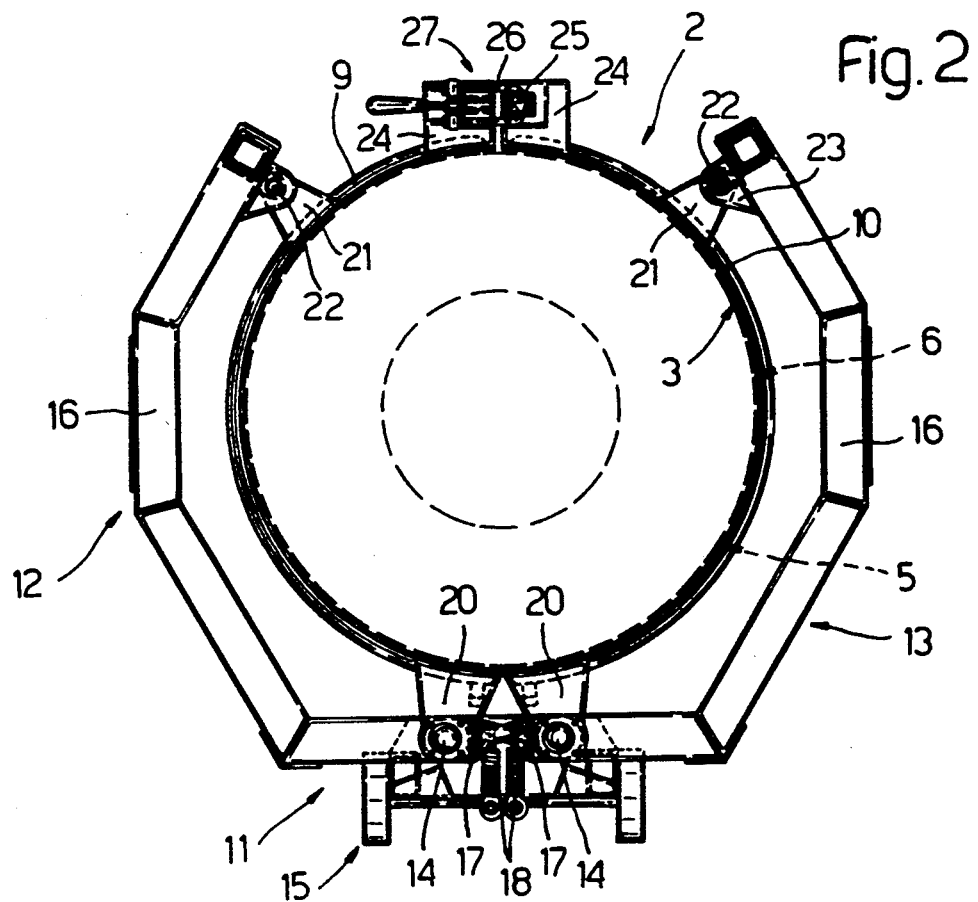

As shown in FIGS. 2 and 3, jacket 2 comprises two substantially semicylindrical heating plates 9 and 10, the width of which is approximately equal to but no greater than, the width of groove 8. A caliper device 11 supports and enables plates 9 and 10 to be moved between a closed position (FIG. 2) contacting lateral surface 6 of mold 5 and defining seat 3, and an open position (FIG. 3) enabling access to seat 3 by mold 5.

As shown in FIGS. 2 and 3, caliper device 11 comprises two curved, facing arms 12 and 13 supporting respective heating plates 9 and 10. Arms 12 and 13 are located on opposite sides of axis 4 of seat 3, and each consists of a rocker arm pivoting on a respective pin 14 parallel to axis 4 on base 15. Each rocker arm comprises a first portion 16 connected to a respective plate 9, 10, and a second portion 17, the free end of which is connected to base 15 by a spring 18, for counteracting rotation of arms 12, 13 into said open position.

Each plate 9, 10 presents a coil 19 defined by a heat exchange fluid conduit or is designed to house an electric resistor (not shown). Plates 9 and 10 are fitted externally with a first bracket 20 on the end closest to base 15, and a second bracket 21 extending outwards from an intermediate portion. Bracket 20 is connected for rotation to a respective pin 14, while second bracket 21 is connected for rotation, via the interposition of a pin 22, to a bracket 23 on portion 16, of a respective arm 12 and 13.

On the opposite end to that fitted with bracket 20, plates 9 and 10 are fitted externally with respective blocks 24. Blocks 24 respectively support the hook 25 and eyelet 26 of a known releasable eccentric clamping device 27 for locking plates 9 and 10 in the closed position, with their opposite ends contacting, and so defining cylindrical jacket 2.

As shown in FIG. 1, station 1 comprises a fixed frame 28 having an intermediate portion 29 supporting base 15; an end portion 30 supporting two fixed shoulders 32; and an end portion 31 supporting two slideways 33. Slideways 33 are parallel to axis 4 and support a slide 34 which moves in a direction 35 parallel to axis 4, by a known hydraulic actuating device 36 which is located between frame 28 and slide 34.

Shoulders 32 and slide 34 support respective portions 37 and 38 of a curing device 39. A detailed description of curing device 39 is given in co-pending U.S. patent application Ser. No. 07/967,395 filed concurrently herewith, to which full reference is made herein in the interest of full disclosure.

Portion 37 comprises a frame 40 consisting of a tubular body 41 and an annular plate 42 integral with each other and coaxial with axis 4. An annular insulating plate 43 is connected to the surface of plate 42 facing jacket 2; and an annular heating plate 44 is connected to plate 43 and positioned, in use, contacting a respective lateral end surface 45 of mold 5.

Inside tubular body 41 and through plates 42, 43 and 44, there is mounted in a sliding manner, by means of actuating jacks 46 on portion 30 of frame 28, a gas curing unit 47 as described in U.S. Pat. No. 5,168,951.

Portion 38 comprises a frame 48 having a tubular body 49 and an annular plate 50 integral with each other and coaxial with axis 4. An annular insulating plate 51 similar to plate 43, is connected to the surface of plate 50 facing jacket 2; and an annular heating plate 52 is connected to plate 51 and positioned, in use, contacting a respective lateral end surface 45 of mold 5.

Inside tubular body 49 and through plates 50, 51 and 52, there are fitted an axial clamping device (not shown) between portions 37 and 38, and a thrust device (not shown) for packing plates 42, 43, 44, 50, 51 and 52 and mold 5 against shoulders 32.

In actual use, before receiving mold 5, station 1 is set up with slide 34 and curing unit 47 in the backup position, and with jacket 2 in the open position for enabling assembly of mold 5 inside seat 3, coaxial with axis 4.

Once mold 5 is loaded, by a known device (not shown), onto plate 44 and between plates 9 and 10 of jacket 2, known actuating devices (not shown) swing plates 9 and 10 about pins 14 from the open position in FIG. 3 to the closed position in FIG. 2. Plates 9 and 10 contact lateral surface 6 of mold 5 and engage groove 8 so as to axially lock mold 5 on intermediate portion 29 of frame 28. Plates 9 and 10 are then locked in the closed position by clamping device 27.

At this point, actuating device 36 of slide 34 is operated to bring plate 52 of portion 38 into contact with mold 5. Jacks 46 of curing unit 47 are operated to engage unit 47 and mold 5; and portions 37 and 38 are connected in a known manner through mold 5 to grip together plates 43, 44, 51 and 52 and mold 5. The green tire (not shown) inside mold 5 is then cured by heating mold 5 by means of plates 44, 52, 9 and 10, and by circulating hot gas inside mold 5 by means of unit 47.

From the foregoing description and the operational discussion, when read in light of the several drawings, it is believed that those familiar with the art will readily recognize and appreciate the novel concepts and features of the present invention. Obviously, while the invention has been described in relation to only a limited number of embodiments, numerous variations, changes, substitutions and equivalents will present themselves to persons skilled in the art and may be made without necessarily departing from the scope and principles of this invention. As a result, the embodiments described herein are subject to various modifications, changes and the like without departing from the spirit and scope of the invention with the latter being determined solely by reference to the claims appended hereto.

I claim:

1. A road vehicle tire curing station, comprising a heating jacket defining a cylindrical seat for an annular forming mold of a green tire; a curing device comprising a first and a second portion on opposite sides of said heating jacket and coaxial with a first axis of said seat, one of said portions comprising a gas curing unit, and each of said two portions comprising a front heating element coaxial with said first axis; first actuating means for moving said first and second portions to and from said heating jacket, so as to bring said heating elements into contact with said mold inside said seat; and second actuating means for axially moving said gas curing unit to and from a position wherein it engages said mold inside said seat.

2. A curing station as claimed in claim 1, in which said heating jacket comprises two substantially semicylindrical heating plates; and including caliper means for supporting and enabling said plates to be moved between a closed position contacting a lateral surface of said mold and defining said cylindrical seat, and an open position enabling access by said mold to said seat.

3. A curing station as claimed in claim 2, in which said caliper means comprises two curved, facing arms supporting a respective one of said heating plates; and in which two arms are located on opposite sides of said first axis of said seat, and are mounted for rotation about respective further second and third axes which are parallel to said first axis of said seat.

4. A curing station as claimed in claim 3, in which each of said arms is a rocker arm pivoting about a respective one of said second and third axes; each of said arms comprising a first portion fitted with a respective one of said heating plates, and a second portion pivoting about a respective one of said second and third axis into said open position against the action of elastic means.

5. A curing station as claimed in claim 2, in which each of said heating plates comprises an inner coil for a heat exchange fluid.

6. A curing station as claimed in claim 1 including fixed frame means and a slide moving to and from said fixed frame means in a direction parallel to said first axis, said slide and said fixed frame means supporting respective first and second portions of said curing device.

7. A curing station as claimed in claim 6, in which said gas curing unit is supported on said fixed frame means; and in which said first actuating means is operatively connected to said slide, and said second actuating means is supported on said fixed frame means.

* * * * *